(12) United States Patent
Basu et al.

(10) Patent No.: US 8,149,733 B2
(45) Date of Patent: Apr. 3, 2012

(54) SYSTEMS AND METHODS FOR SYNCHRONIZING COMMUNICATION NETWORKS

(75) Inventors: Prithwish Basu, Cambridge, MA (US); Lillian Lei Dai, Cambridge, MA (US); Jason Keith Redi, Belmont, MA (US); William Nii Tetteh, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1090 days.

(21) Appl. No.: 11/895,527

(22) Filed: Aug. 24, 2007

(65) Prior Publication Data
US 2008/0232344 A1  Sep. 25, 2008

Related U.S. Application Data

(60) Provisional application No. 60/840,417, filed on Aug. 25, 2006.

(51) Int. Cl.
*H04J 3/06* (2006.01)
*H04L 12/28* (2006.01)

(52) U.S. Cl. ........ 370/254; 370/311; 370/318; 370/328; 370/338; 370/350; 370/230; 370/324; 370/429; 370/458; 370/465; 455/422.1; 455/436; 455/560

(58) Field of Classification Search .......... 370/335–503; 455/227, 522, 524
See application file for complete search history.

(56) References Cited

U.S. PATENT DOCUMENTS

| | | |
|---|---|---|
| 4,964,121 A | 10/1990 | Moore |
| 5,119,373 A * | 6/1992 | Fredricsson et al. .......... 370/458 |
| 5,128,938 A | 7/1992 | Borras |
| 5,203,020 A | 4/1993 | Sato et al. |
| 5,301,225 A | 4/1994 | Suzuki et al. |
| 5,418,539 A | 5/1995 | Sezai et al. |
| 5,430,731 A | 7/1995 | Umemoto et al. |
| 5,583,866 A | 12/1996 | Vook et al. |
| 5,590,396 A | 12/1996 | Henry |
| 5,649,108 A | 7/1997 | Spiegel et al. |
| 5,710,975 A | 1/1998 | Bernhardt et al. |
| 5,754,790 A | 5/1998 | France et al. |
| 5,790,946 A | 8/1998 | Rotzoll |
| 5,987,024 A | 11/1999 | Duch et al. |

(Continued)

FOREIGN PATENT DOCUMENTS
WO  WO 2005022854 A2 *  3/2005

OTHER PUBLICATIONS

U.S. Appl. No. 10/786,288, Elliott.

(Continued)

*Primary Examiner* — Ayaz Sheikh
*Assistant Examiner* — Venkatesh Haliyur
(74) *Attorney, Agent, or Firm* — Ropes & Gray LLP

(57) ABSTRACT

In many aspects, the invention relates to systems and methods for synchronizing a communication network, particularly a slotted communication network, having a plurality of nodes. In slotted communication networks, the nodes are configured to transmit or receive data during selected time slots. During a selected time slot, each node transmits a synchronization message that is received by a neighboring node. The neighboring node adjusts its time slot boundary to coincide with the time of receipt of the synchronization message, thereby synchronizing each node with a neighboring node. Such systems and methods are energy efficient, accurate, fast, fault tolerant and easy to implement.

18 Claims, 11 Drawing Sheets

U.S. PATENT DOCUMENTS

| | | | |
|---|---|---|---|
| 6,016,322 A | 1/2000 | Goldman | |
| 6,028,853 A * | 2/2000 | Haartsen | 370/338 |
| 6,052,779 A | 4/2000 | Jackson et al. | |
| 6,058,106 A | 5/2000 | Cudak et al. | |
| 6,097,957 A | 8/2000 | Bonta et al. | |
| 6,104,708 A | 8/2000 | Bergamo | |
| 6,118,769 A * | 9/2000 | Pries et al. | 370/324 |
| 6,127,799 A | 10/2000 | Krishnan | |
| 6,130,881 A | 10/2000 | Stiller et al. | |
| 6,188,911 B1 | 2/2001 | Wallentin et al. | |
| 6,192,230 B1 | 2/2001 | van Bokhorst et al. | |
| 6,208,247 B1 | 3/2001 | Agre et al. | |
| 6,243,579 B1 | 6/2001 | Kari et al. | |
| 6,262,684 B1 | 7/2001 | Stewart et al. | |
| 6,292,508 B1 | 9/2001 | Hong et al. | |
| 6,304,215 B1 | 10/2001 | Proctor, Jr. et al. | |
| 6,359,901 B1 * | 3/2002 | Todd et al. | 370/465 |
| 6,374,311 B1 | 4/2002 | Mahany et al. | |
| 6,377,211 B1 | 4/2002 | Hsiung | |
| 6,381,467 B1 | 4/2002 | Hill et al. | |
| 6,400,317 B2 | 6/2002 | Rouphael et al. | |
| 6,404,386 B1 | 6/2002 | Proctor, Jr. et al. | |
| 6,414,955 B1 | 7/2002 | Clare et al. | |
| 6,418,148 B1 | 7/2002 | Kumar et al. | |
| 6,463,307 B1 | 10/2002 | Larsson et al. | |
| 6,473,607 B1 | 10/2002 | Shohara et al. | |
| 6,476,773 B2 | 11/2002 | Palmer et al. | |
| 6,477,361 B1 | 11/2002 | LaGrotta et al. | |
| 6,490,461 B1 | 12/2002 | Muller et al. | |
| 6,498,939 B1 | 12/2002 | Thomas | |
| 6,512,935 B1 | 1/2003 | Redi | |
| 6,564,074 B2 | 5/2003 | Romans | |
| 6,574,269 B1 | 6/2003 | Bergamo | |
| 6,583,675 B2 | 6/2003 | Gomez | |
| 6,590,889 B1 | 7/2003 | Preuss et al. | |
| 6,598,034 B1 | 7/2003 | Kloth | |
| 6,601,093 B1 | 7/2003 | Peters | |
| 6,611,231 B2 | 8/2003 | Crilly, Jr. et al. | |
| 6,611,233 B2 | 8/2003 | Kimura | |
| 6,671,525 B2 | 12/2003 | Allen et al. | |
| 6,694,149 B1 | 2/2004 | Ady et al. | |
| 6,714,983 B1 | 3/2004 | Koenck et al. | |
| 6,721,275 B1 | 4/2004 | Rodeheffer et al. | |
| 6,735,178 B1 | 5/2004 | Srivastava et al. | |
| 6,735,630 B1 | 5/2004 | Gelvin et al. | |
| 6,745,027 B2 | 6/2004 | Twitchell, Jr. | |
| 6,757,248 B1 | 6/2004 | Li et al. | |
| 6,760,584 B2 | 7/2004 | Jou | |
| 6,791,949 B1 | 9/2004 | Ryu et al. | |
| 6,804,208 B2 | 10/2004 | Cain et al. | |
| 6,816,115 B1 | 11/2004 | Redi et al. | |
| 6,859,135 B1 | 2/2005 | Elliott | |
| 6,888,819 B1 | 5/2005 | Mushkin et al. | |
| 6,894,975 B1 | 5/2005 | Partyka | |
| 6,894,991 B2 | 5/2005 | Ayyagari et al. | |
| 6,920,123 B1 | 7/2005 | Shin et al. | |
| 6,973,039 B2 | 12/2005 | Redi et al. | |
| 6,981,052 B1 | 12/2005 | Cheriton | |
| 6,990,075 B2 | 1/2006 | Krishnamurthy et al. | |
| 7,020,501 B1 | 3/2006 | Elliott et al. | |
| 7,020,701 B1 | 3/2006 | Gelvin et al. | |
| 7,027,392 B2 | 4/2006 | Holtzman et al. | |
| 7,046,639 B2 | 5/2006 | Garcia-Luna-Aceves et al. | |
| 7,058,031 B2 | 6/2006 | Bender et al. | |
| 7,072,432 B2 | 7/2006 | Belcea | |
| 7,088,678 B1 * | 8/2006 | Freed et al. | 370/230 |
| 7,103,344 B2 | 9/2006 | Menard | |
| 7,110,783 B2 | 9/2006 | Bahl et al. | |
| 7,113,505 B2 * | 9/2006 | Williams | 370/370 |
| 7,133,398 B2 | 11/2006 | Allen et al. | |
| 7,142,520 B1 | 11/2006 | Haverinen et al. | |
| 7,142,864 B2 | 11/2006 | Laroia et al. | |
| 7,151,945 B2 | 12/2006 | Myles et al. | |
| 7,155,263 B1 | 12/2006 | Bergamo | |
| 7,165,102 B2 | 1/2007 | Shah et al. | |
| 7,184,413 B2 * | 2/2007 | Beyer et al. | 370/254 |
| 7,209,771 B2 | 4/2007 | Twitchell, Jr. | |
| 7,218,630 B1 | 5/2007 | Rahman | |
| 7,286,844 B1 | 10/2007 | Redi et al. | |
| 7,330,736 B2 * | 2/2008 | Redi | 455/553.1 |
| 7,342,876 B2 | 3/2008 | Bellur et al. | |
| 7,346,679 B2 | 3/2008 | Padmanabhan et al. | |
| 7,349,370 B2 | 3/2008 | Lee et al. | |
| 7,363,371 B2 | 4/2008 | Kirkby et al. | |
| 7,369,512 B1 | 5/2008 | Shurbanov et al. | |
| 7,376,827 B1 | 5/2008 | Jiao | |
| 7,388,847 B2 | 6/2008 | Dubuc et al. | |
| 7,466,655 B1 | 12/2008 | Zhao | |
| 7,489,635 B2 | 2/2009 | Evans et al. | |
| 7,489,638 B2 * | 2/2009 | Keslassy et al. | 370/238 |
| 7,523,220 B2 | 4/2009 | Tan et al. | |
| 7,583,654 B2 * | 9/2009 | Zumsteg | 370/350 |
| 7,599,443 B2 | 10/2009 | Ionescu et al. | |
| 7,664,055 B2 * | 2/2010 | Nelson | 370/256 |
| 7,668,127 B2 * | 2/2010 | Krishnamurthy et al. | 370/311 |
| 7,688,772 B2 * | 3/2010 | Sinivaara et al. | 370/318 |
| 7,719,989 B2 | 5/2010 | Yau | |
| 7,720,382 B2 * | 5/2010 | Haxell et al. | 398/75 |
| 7,742,399 B2 | 6/2010 | Pun | |
| 7,764,617 B2 | 7/2010 | Cain et al. | |
| 7,881,202 B2 | 2/2011 | Lansing et al. | |
| 2002/0067736 A1 * | 6/2002 | Garcia-Luna-Aceves et al. | 370/442 |
| 2002/0071395 A1 | 6/2002 | Redi et al. | |
| 2002/0145978 A1 | 10/2002 | Batsell et al. | |
| 2002/0146985 A1 | 10/2002 | Naden | |
| 2002/0147816 A1 | 10/2002 | Hlasny | |
| 2002/0186167 A1 | 12/2002 | Anderson | |
| 2003/0037167 A1 | 2/2003 | Garcia-Luna-Aceves et al. | |
| 2003/0066090 A1 | 4/2003 | Traw et al. | |
| 2003/0067892 A1 | 4/2003 | Beyer et al. | |
| 2003/0099210 A1 | 5/2003 | O'Toole et al. | |
| 2003/0114204 A1 | 6/2003 | Allen et al. | |
| 2003/0115369 A1 | 6/2003 | Walter et al. | |
| 2003/0119568 A1 | 6/2003 | Menard | |
| 2003/0152110 A1 | 8/2003 | Rune | |
| 2003/0179742 A1 | 9/2003 | Ogier et al. | |
| 2003/0185170 A1 | 10/2003 | Allen et al. | |
| 2003/0202490 A1 | 10/2003 | Gunnarsson et al. | |
| 2003/0222819 A1 | 12/2003 | Karr et al. | |
| 2004/0077353 A1 | 4/2004 | Mahany | |
| 2004/0125773 A1 | 7/2004 | Wilson et al. | |
| 2004/0176023 A1 | 9/2004 | Linder et al. | |
| 2004/0218580 A1 | 11/2004 | Bahl et al. | |
| 2004/0230638 A1 | 11/2004 | Balachandran et al. | |
| 2005/0009578 A1 | 1/2005 | Liu | |
| 2005/0059347 A1 | 3/2005 | Haartsen | |
| 2005/0114551 A1 * | 5/2005 | Basu et al. | 709/249 |
| 2005/0124313 A1 | 6/2005 | Simpson et al. | |
| 2005/0134403 A1 | 6/2005 | Kajiya | |
| 2005/0135379 A1 | 6/2005 | Callaway et al. | |
| 2005/0152329 A1 | 7/2005 | Krishnan et al. | |
| 2005/0176468 A1 | 8/2005 | Iacono et al. | |
| 2005/0185632 A1 | 8/2005 | Draves, Jr. et al. | |
| 2005/0207376 A1 | 9/2005 | Ashwood-Smith | |
| 2005/0215196 A1 | 9/2005 | Krishnan et al. | |
| 2005/0215280 A1 | 9/2005 | Twitchell, Jr. | |
| 2006/0007865 A1 | 1/2006 | White et al. | |
| 2006/0010249 A1 | 1/2006 | Sabesan et al. | |
| 2006/0013160 A1 * | 1/2006 | Haartsen | 370/328 |
| 2006/0047807 A1 | 3/2006 | Magnaghi et al. | |
| 2006/0058102 A1 | 3/2006 | Nguyen et al. | |
| 2006/0068837 A1 | 3/2006 | Malone | |
| 2006/0107081 A1 | 5/2006 | Krantz et al. | |
| 2006/0126514 A1 | 6/2006 | Lee et al. | |
| 2006/0135145 A1 | 6/2006 | Redi | |
| 2006/0215583 A1 * | 9/2006 | Castagnoli | 370/254 |
| 2006/0227724 A1 | 10/2006 | Thubert et al. | |
| 2006/0229083 A1 | 10/2006 | Redi | |
| 2007/0070983 A1 | 3/2007 | Redi et al. | |
| 2007/0110000 A1 | 5/2007 | Abedi | |
| 2007/0149204 A1 | 6/2007 | Redi et al. | |
| 2007/0153731 A1 | 7/2007 | Fine | |
| 2008/0049620 A1 | 2/2008 | Riga et al. | |
| 2008/0232258 A1 | 9/2008 | Larsson et al. | |

| | | |
|---|---|---|
| 2009/0103461 A1 | 4/2009 | Tan et al. |
| 2009/0129316 A1 | 5/2009 | Ramanathan et al. |
| 2009/0161641 A1 | 6/2009 | Kim |

OTHER PUBLICATIONS

U.S. Appl. No. 10/677,945, Redi.
U.S. Appl. No. 11/895,608, Riga et al.
Hong et al. "Scalable Routing Protocols for Mobile Ad Hoc Networks," IEEE Network; pp. 11-21. (Jul./Aug. 2002).
Lang "A Comprehensive Overview about Selected Ad Hoc Networking Routing Protocols," (2003).
Halvardsson et al, "Reliable Group Communication in a Military Mobile Ad Hoc Network," Vaxjo University School of Mathematics and Systems Engineering, Report # 04006, pp. 1-52 (2004).
Wieselthier et al, "On the Construction of Energy-Efficient Broadcast and Multicast Tress in Wireless Networks," IEE Infocom 2000, p. 585-94 (2000).
Ruppe et al, "Near Term Digital Radio (NTDR) System," IE, pp. 1282-1287 (1997).
Ogier et al, "Topology Dissemination Based on Reverse-Path Forwarding (TBRPF)," Sunsite.dk, Technical Memo, RFC 3684, The Internet Society), pp. 1-49 (2004.
Clausen, et al, "Optimized Link State Routing Protocol (OLSR)," Technical Memo, RFC 3626, The Internet Society, pp. 1-6 (2003).
Sichitiu et al, "Simple, Accurate Time Synchronization for Wireless Sensor Networks," Proc. IEEE, WCNC pp. 1266-1273 (2003).
Mills, David L., "Internet Time Synchronization: The Network Time Protocol," IEEE Transactions on Communications, 39:10; pp. 1482-1492. (1991).
Ganeriwal et al, "Timing-sync Protocol for Sensor Networks," Proc. ACM SenSys (2003).
Ebner et al, "Synchronization in Ad Hoc Networks Based on UTRA TDD" (2003).
Li et al., Global Clock Synchronization in Sensor Networks, Proc. IEEE Infocom (2004).
Maroti et al., "The Flooding Time Synchronization Protocol," Proc. ACM Sensys. (2004).
Elson et al., "Fine-Grained Network Time Synchronization using Reference Broadcasts," Proc. USENIX OSDI, pp. 147-163 (2002).
Werner-Allen et al, "Firefly-Inspired Sensor Network Synchronicity with Realistic Radio Effects," Proc. ACM Sensys, pp. 142-153 (2005).
Warneke et al, "Ultra-Low Power Communication Logic Circuits for Distributed Sensor Networks," UC Berkeley, 7 pgs (1998).
Warneke, "Ultra-Low Power Circuits for Distributed Sensor Networks (Smart Dust)," UC Berkeley, pp. 1-3 (printed Jun. 15, 2003).
Darabi et al, "An Ultra Low Power 900 MHz CMOS Receiver for Wireless Paging," Univ. of CA, Los Angeles, pp. 1-33 (May 17, 1998).
Liu et al., "A Bluetooth Scatternet-Route Structure for Multihop Ad Hoc Networks," IEEE J. on Selected Areas in Communications, 21:2(229-39); Feb. 2003.
Salkintzis et al., "Performance analysis of a Downlink MAC Protocol with Power-Saving Support," IEEE Transactions on Vehicular Tech., 49:3(1029-40); May 2000.
Chlamtac et al., "An Energy-Conserving Access Protocol for Wireless Communication," Proc. of Int'l. Conf. on Comm., pp. 1-4 (Jun. 1997).
Office Action dated Sep. 8, 2006, U.S. Appl. No. 10/786,288.
Office Action dated Mar. 30, 2007, U.S. Appl. No. 10/786,288.
Office Action dated Sep. 25, 2007, U.S. Appl. No. 10/786,288.
Office Action dated Jun. 15, 2007, U.S. Appl. No. 10/677,945.
Office Action dated May 7, 2007, U.S. Appl. No. 11/078,257.
Office Action dated Dec. 23, 2009, U.S. Appl. No. 11/439,320.
Ebner A et al: "Decentralized Slot Synchronization in Highly Dynamic Ad Hoc Networks" Wireless Personal Mutlimedia Communications, 2002, IEEE, vol. 2, (Oct. 27, 2002).
Zhijun Shang et al: "A Low Overhead Multi-Hop Time Sync Protocol for Wireless Sensor Networks" Networking, Sensing and Control, 2005, IEEE (Mar. 19, 2005), pp. 54-59.

Tjoa R et al: "Clock Drift Reduction for Relative Time Slot TDMA-Based Sensor Networks" (Sep. 5, 2004) PIMRC 2004, IEEE, pp. 1042-1047.
Dai H et al: "Tsync: A Lightweight Bidirectional Time Synchronization Service for Wireless Sensor Networks" (Jan. 2004), Mobile Computing and Communications Review, ACM, NY, pp. 125-139, ISSN: 1091-1669.
Office Action dated Aug. 26, 2009, U.S. Appl. No. 11/439,320.
Office Action dated Sep. 16, 2009, U.S. Appl. No. 11/347,963.
Singh S et al "Power-Aware Routing in Mobile Ad Hoc Networks" Mobicom '98, Proceedings of the 4th Annual ACM/IEEE International Conference on Mobile Computing and Networking, Dallas, TX (Oct. 25-30, 1998) XP000850267, pp. 181-190.
Fan Ye et al "A randomized energy-conservation protocol for resilient sensor networks*" Wireless Networks; The Journal of Mobile Communication, Computation and Information, Kluwer Academic Publishers, Do, vol. 12, No. 5, (Apr. 27, 2006) pp. 637-652.
Office Action dated Apr. 3, 2008, U.S. Appl. No. 10/786,288.
Office Action dated Dec. 12, 2007, U.S. Appl. No. 10/677,945.
Clare et al, "Self-Organizing Distributed Sensor Networks," Rockwell Science Center, Electrical Engineering Department, Univ. of California Los Angeles; 9 pages.
Doherty, "Algorithms for Position and Data Recovery in Wireless Sensor Networks," Department of Electrical Engineering and Computer Sciences, Univ. of California at Berkeley; 54 pages.
Florens, C. et al. "Scheduling Algorithms for Wireless Ad-Hoc Sensor Networks", Global Telecommunications Conference, 2002. GLOBECOM '02 IEEE. vol. 1, pp. 6-10 (2002).
Huang, Z. et al., "A Busy-Tone Based Directional MAC Protocol for Ad Hoc Networks", MILCOM 2002. Proceedings. IEEE, vol. 2. pp. 1233-1238 (2002).
Huang, Z. et al., "A Comparison Study of Omnidirectional and Directional MAC Protocols for Ad Hoc Networks". Global Telecommunications Conference, GLOBECOM '02. IEEE, vol. 1, p. 57 (2002).
Ko, Y.B. et al., "Medium Access Control Protocols Using Directional Antennas in Ad Hoc Networks", INFOCOM 19th Annual Joint Conference of the IEEE Computer and Communications Societies, IEEE, vol. 1:13 (2000).
Liu et al, "Simulation Modeling of Large-Scale Ad-hoc Sensor Networks," European Simulation Interoperability Workshop, Univ. of Westminster, London; 12 pages, Jun. 25-27.
Mauve, M. et al. A Survey on Position-Based Routing in Mobile Ad Hoc Networks. Network, IEEE. 15:6, 30-9 (2001).
Nasipuri, A. et al. A MAC Protocol for Mobile Ad Hoc Networks Using Directional Antennas. Wireless Communications and Networking Conference 2000. WCNC. 2000 IEEE, 3:1214-19. (2000).
Rowson et al, "Everyday Problems and Always-On Radios," Berkeley Wireless Research Cetner, 11 pages.
Shah, "Energy Aware Routing for PicoRadio," Berkeley Wireless Research Center, 39 pages.
Swaneck, "Integrating Passive RF Technology with Cryptographic Communications Protocols," Microchip Technology Inc., 7 pages (2000).
Van Dyck et al, "Distributed Sensor Processing Over an Ad Hoc Wireless Network: Simulation Framework and Performance Criteria," Wireless Communications Technologies Group, National Institute of Standards and Technology, Gaithersburg, Maryland, 5 pages.
XE-1218—Single Chip Receiver; XEMICS; 8 pages (2001).
Office Action dated Dec. 10, 2008, U.S. Appl. No. 11/439,320.
Office Action dated Dec. 9, 2008, U.S. Appl. No. 11/347,963.
Office Action dated Sep. 8, 2010 U.S. Appl. No. 12/229,039.
Shurbanov et al., "Energy-Efficient Flooding in Mobile Ad-Hoc Networks", Proceedings of 23rd Annual Army Science Conference, Orlando, FL, 2 pages (2002).
Office Action dated Mar. 15, 2010, U.S. Appl. No. 12/229,039.
Office Action dated Jul. 7, 2010, U.S. Appl. No. 11/439,320.
Office Action dated Jul. 20, 2010 U.S. Appl. No. 11/656,767.
Office Action dated Aug. 3, 2010 U.S. Appl. No. 11/895,608.
Office Action dated Jan. 7, 2011 U.S. Appl. No. 11/656,767.
Office Action dated Feb. 17, 2011 U.S. Appl. No. 11/439,320.
Office Action dated Feb. 18, 2011 U.S. Appl. No. 12/229,039.

* cited by examiner

SYSTEMS AND METHODS FOR SYNCHRONIZING COMMUNICATION NETWORKS

CROSS REFERENCE TO RELATED APPLICATIONS

This application claims priority from U.S. Provisional Application No. 60/840,417, filed Aug. 25, 2006, the disclosures of which are incorporated herein by reference in their entirety.

GOVERNMENT CONTRACT

The U.S. Government has a paid-up license in this invention and the right in limited circumstances to require the patent owner to license others on reasonable terms as provided for by the terms of Contract No. DAAD19-01-2-0011 awarded by U.S. Army Research Laboratory (ARL).

FIELD OF INVENTION

The present invention generally relates to systems and methods for synchronizing devices or nodes in communication networks, particularly slotted ad-hoc communication networks such as wireless sensor networks.

BACKGROUND

Wireless sensor networks (WSN) are widely used in a number of military and civilian applications including battlefield surveillance, environment/habitat monitoring, healthcare applications, home automation and traffic control. These WSNs are typically ad-hoc networks that include spatially distributed devices or nodes having transceivers and sensors to cooperatively monitor physical or environmental conditions and to communicate relevant information. The nodes are typically powered by an on-board battery supply so that they may be deployed in isolated locations and operate autonomously. To conserve battery energy and thereby permit long-term use, the nodes are typically duty-cycled whereby each node is turned on or off during selected time slots.

In ad-hoc communication networks including WSNs, each node may be willing to forward information from one node to a neighboring node thereby establishing one or more communication channels through the network. However, due to signal propagation delay between nodes and drifting clocks within each node, the time slots in neighboring nodes and across the network are not synchronized. This poses a communication problem because, when one node transmits information, another node that would otherwise be required to be turned on to receive the information might be off and unable to receive information or only receive portions of information.

Current techniques to solve this problem focus on synchronizing time clocks in each of the nodes in the network to a single global time. Most of these techniques involve an elaborate process of exchanging a series of messages between nodes that contain time stamped information generated in higher layers of the network protocol stack. A dominant source of error in such techniques is the variability between nodes in the time spent by the time-stamped messages in these higher layers. Furthermore, these techniques are energy inefficient in that they require numerous exchanges of timing information between nodes to synchronize their respective clocks, as well as the additional step of aligning the boundaries of the time slots based on the now synchronized clocks.

Accordingly there is a need for an alternative technique to synchronize nodes in communication networks such as WSNs.

SUMMARY OF THE INVENTION

The systems and methods described herein provide for an accurate, energy efficient and fault tolerant synchronization scheme that synchronizes boundaries of time slots in neighboring nodes in slotted wireless communication networks, for example, without the nodes first synchronizing clocks. The nodes in slotted communication networks are configured to transmit or receive data during one or more selected time slots. Typically, these time slots are short intervals in time (e.g., 20 ms), during which a node transmits or receives packets of data. The beginning and the end of these time slots are referred to as the boundary or boundary region of the time slots. In certain embodiments, during certain ones of these time slots, one or more nodes transmit a synchronization message that is received by one or more neighboring nodes. The neighboring nodes adjust the boundary of their time slots based on the time of receipt of the synchronization message, thereby synchronizing the neighboring nodes to the transmitting one or more nodes.

According to one aspect, the invention relates to a method for synchronizing a communication network. The method includes providing a slotted communication network, such as a mobile ad-hoc network, a wireless sensor network or a wireless mesh network, which includes at least a first node and a second node. The first node is configured to operate at least during a first time slot, and the second node is configured to operate at least during a second time slot, which corresponds to the first time slot. In certain embodiments, the first node and/or the second nodes are configured to operate during a plurality of time slots according to pre-determined schedule and/or a dynamically determined schedule.

The method further includes transmitting, from the first node, a message during the first time slot and receiving the message at the second node at a first receipt time during the second time slot. The message may include network topology information and/or a heartbeat signal. The method includes the step of aligning a boundary portion of the second time slot with the first receipt time, thereby synchronizing the second time slot with the first time slot.

The step of aligning the boundary portion of the second time slot may include shifting a start time or an end time of the second time slot based on the first receipt time. In certain embodiments, the boundary portion includes a guard time, and the second time slot includes a data time period in between two guard time periods during which data packets may be transmitted and/or received. In such embodiments, aligning the boundary portion of the second time slot includes aligning an edge of the guard time period of the second time slot with the first receipt time. The message may be transmitted from the first node, during or at the beginning of a boundary portion of the first time slot.

Additionally and optionally, the method may include repeating the steps of transmitting the message, receiving the message and, aligning a time slot after a re-sync time period has elapsed. At least one of the first time slot and second time slot may include a guard time period having a length based at least in part on the re-sync time period.

In certain embodiments, the slotted communication network further includes a third node configured to operate during a third time slot. In such embodiments, the method may include the steps of transmitting, from the second node, a second message during the second time slot, receiving the second message at the third node, at a second receipt time during the third time slot, and aligning a boundary portion of the third time slot with the second receipt time, thereby synchronizing the third time slot with the second time slot.

According to another aspect, the invention relates to a node in a slotted-communication network. The node includes a receiver and a processor. The receiver is configured to receive a message, such as a heartbeat signal, at a receipt time during a first time slot. The message would have been transmitted by a transmitting node. The processor may be configured for aligning a boundary portion of the first time slot with the receipt time. In certain embodiments, the processor aligns the boundary portion of the first time slot with the receipt time without synchronizing the clock of the node with the clock of the transmitting node. The node may further include a transmitter for transmitting a message during a second time slot based on which a second node synchronizes at least one time slot to at least one time slot of the node.

In certain embodiments, the processor aligns the boundary portion of the first time slot by shifting a start time or an end time of the first time slot based on the receipt time. In certain embodiments, the boundary portion includes a guard time, and the first time slot includes a data time period in between two guard time periods during which data packets may be transmitted and/or received. In such embodiments, the processor aligns the boundary portion of the first time slot by aligning an edge of the guard time period of the first time slot with the receipt time. The message may be transmitted from the first node, during or at the beginning of a boundary portion of the first time slot.

Additionally and optionally, after a re-sync time period has elapsed, the receiver may receive a second message and the processor aligns a second time slot to the receipt time of the second message. The first time slot may include a guard time period having a length based at least in part on the re-sync time period.

According to another aspect, the invention relates to a method for synchronizing a communication network. The method includes providing a network topology for a communication network including a plurality of nodes, and selecting a root node from the plurality of nodes in the network. The method further include transmitting from a first node a first message, and aligning a slot boundary of a second node, neighboring the first node along the network topology, based on the receipt time of the first message. In certain embodiments, the method includes transmitting from the second node a second message, and aligning a slot boundary of a third node, neighboring the second node along the network topology, based on the receipt time of the second message.

In still another aspect, the invention relates to a method for synchronizing communication schedules of nodes in a communication network having a plurality of nodes. The method includes transmitting a plurality of messages from the plurality of nodes, receiving at a first node, the plurality of messages, calculating a statistic based, at least in part, on a time of reception of each of the plurality of messages, and synchronizing the first node based on the statistic. In certain embodiments, the statistic is calculated based on a set of slot deltas between neighboring nodes. The slot deltas may represent differences between start times of slots of the first node and start times of slots of the plurality of nodes.

BRIEF DESCRIPTION OF THE DRAWINGS

The following figures depict certain illustrative embodiments of the invention in which like reference numerals refer to like elements. These depicted embodiments may not be drawn to scale and are to be understood as illustrative of the invention and not as limiting in any way.

DETAILED DESCRIPTION OF CERTAIN ILLUSTRATED EMBODIMENTS

To provide an overall understanding of the invention, certain illustrative embodiments will now be described, including the network synchronization scheme and constituent components thereof. However, it will be understood by one of ordinary skill in the art that the methods and systems described herein may be adapted and modified as is appropriate for the application being addressed and that the systems and methods described herein may be employed in other suitable applications, and that such other additions and modifications will not depart from the scope hereof.

As will be seen from the following description, in one aspect, the invention relates to systems and methods for synchronizing a communication network, particularly a slotted communication network, having a plurality of nodes. In slotted communication networks, the nodes are configured to transmit or receive data during one or more selected time slots. During these selected time slots, each node may transmit a synchronization message that is received by a neighboring node. The neighboring node adjusts its time slot boundary based on the time of receipt of the synchronization message, thereby synchronizing each node with a neighboring node.

Figure 1:
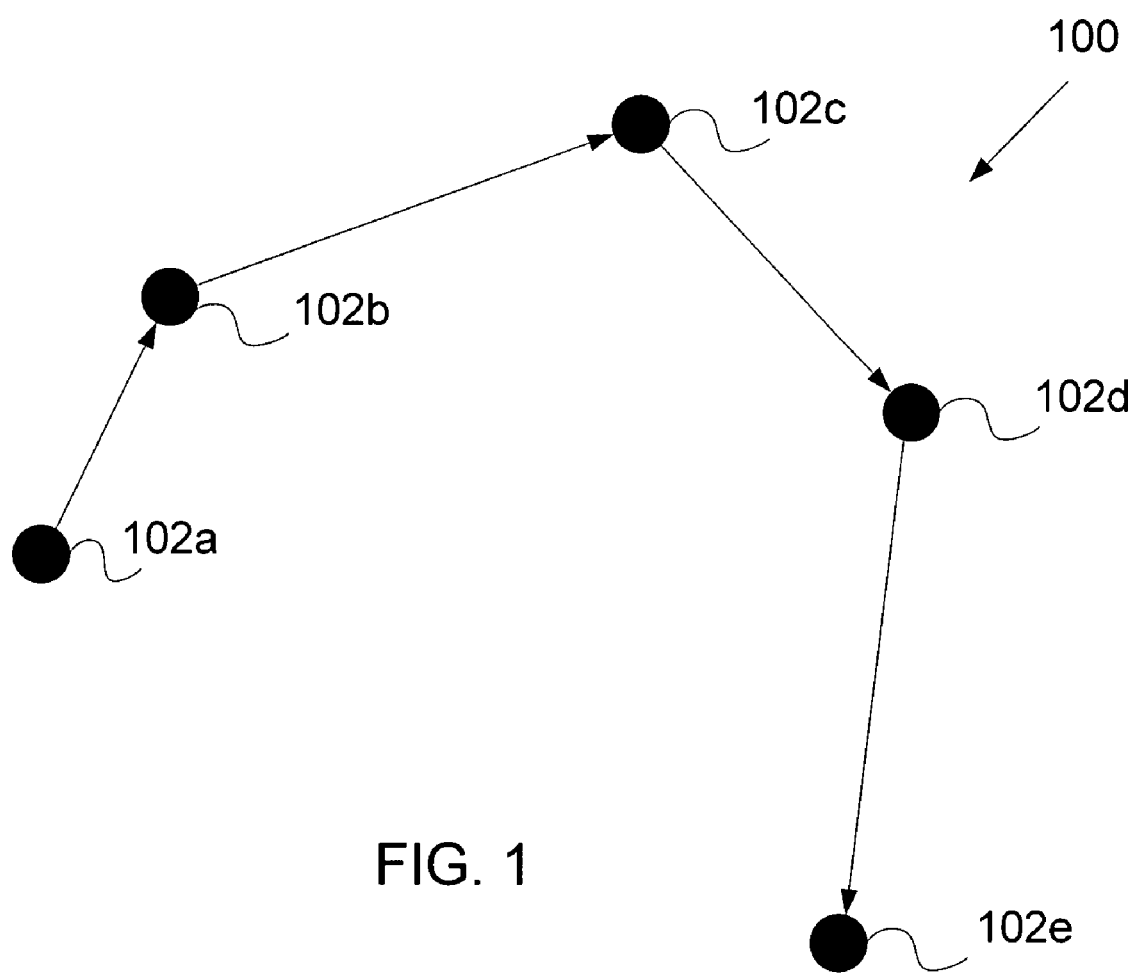
FIG. 1 depicts an exemplary slotted ad-hoc communication network.

FIG. 1 depicts an exemplary communication network 100 having devices or nodes 102a-102e (generally, "nodes 102") that are illustrated as being spatially separated from each other. Each node may be capable of communicating with one or more other nodes in the network 100 along any direction. In typical ad-hoc communication networks, a node 102 communicates with other neighboring nodes 102 in the network, i.e., nodes located within its communication range. For example, node 102c may be able to communicate with either one of neighboring nodes 102b or 102d. Nodes 102 may also be able to communicate with more distant nodes (i.e., those nodes that are out of communication range) through a hopping process whereby one node 102 communicates with a neighboring node 102, which in turn communicates with another node 102 that is more distant. Such a hopping process, common to ad-hoc communication networks, facilitates communication across vast distances whereby nodes transmit or receive data packets from distant nodes by hopping through one or more intermediate nodes. For example, node 102b looking to transmit a data packet to node 102e, first transmits the message to node 102c. Node 102c then transmits the received data to node 102d, and node 102d finally transmits the data to the destination node 102e. In certain communication networks (such as mobile sensor networks), the nodes 102 may be able to move from one location to another and thereby communicate with other nodes 102 in the network that were previously distant nodes. For example, node 102c may move closer to node 102a and be able to directly communicate with node 102a.

The nodes 102a-102e may include sensors in a wireless sensor network whereby the sensors are capable of measuring at least one of heat, pressure, sound, light, electro-magnetic field and vibration. The nodes 102a-102e may also include computer components for processing the sensor data and for communicating the sensor data to other nodes in the network 100. The computer components may be used for managing the operation of a node, and transmission and/or reception of data packets to and from a node.

As noted earlier, nodes 102 in a stationary or mobile slotted communication network 100 are configured to operate during one or more selected time slots during which a node transmits or receives packets of data. Different nodes 102 may be scheduled to operate during different such time slots to allow for a communication across a network.

Figure 2:
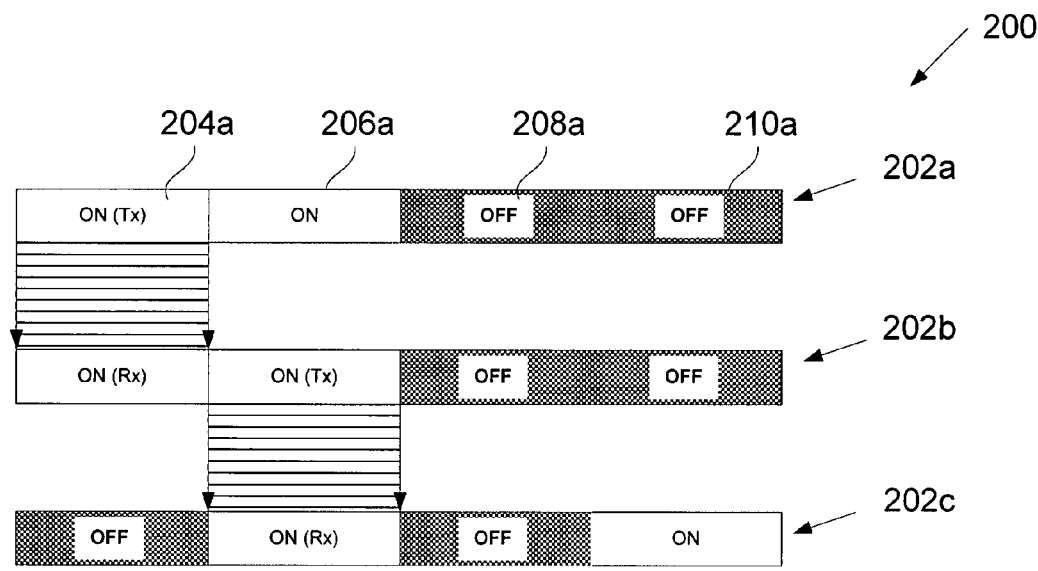
FIG. 2 depicts a pair of nodes communicating in the communication network of FIG. 1, according to an illustrative embodiment of the invention.

FIG. 2 depicts an exemplary time slot scheduling scheme 200 that allows communication between nodes through a network 100. In particular, FIG. 2 shows time slot schedules 202a, 202b and 202c for nodes 102a, 102b and 102c, respectively. The time slot schedules 202a, 202b and 202c identify when the nodes 102a, 102b and 102c are powered-on and when they transmit and/or receive data. Schedule 202a includes adjacent time slots 204a, 206a, 208a and 210a. Similarly, schedules 202b and 202c include a corresponding set of time slots. In such protocols, the time slots may be allocated in a periodic fashion such that they repeat after certain intervals of time. The time slots may be of fixed or variable length depending on the nature of the application. In certain embodiments, each of the time slots are about 20 ms long. Time slots can be longer or shorter than 20 ms, without departing from the scope of the invention. One class of protocols often used for scheduling in an ad-hoc networking environment is a Time Division Multiple Access (TDMA) Multiplexing MAC layer protocol. In practice, a communication device using a periodic TDMA communications protocol remains in one of two states, transmit or receive. In order to remain in either state, the communication device supplies power to a transceiver.

As shown in FIG. 2, the node 102a is "on," i.e., its transceiver is operational, during time slot 204a. The data packet that is transmitted from node 102a during time slot 204a is received at node 102b during the time slot 204b. The node 102b is configured to transmit the same or another data packet during the next time slot 206b. The data packet transmitted from node 102b is received at node 102c during the time slot 206c. As shown in FIG. 2, the boundaries of slots in neighboring nodes are aligned with each other, i.e., for example, the beginning of slot 204a is scheduled for the same time as the beginning of slot 204b. However, in practicality, in most slotted communication networks, the time slots of communicating nodes are misaligned. Such a misalignment of time slots can occur due to various factors including factors that are internal to the node (e.g., clock drifts), and factors that are external to the node (e.g., distance between nodes and propagation delays).

Figure 3:
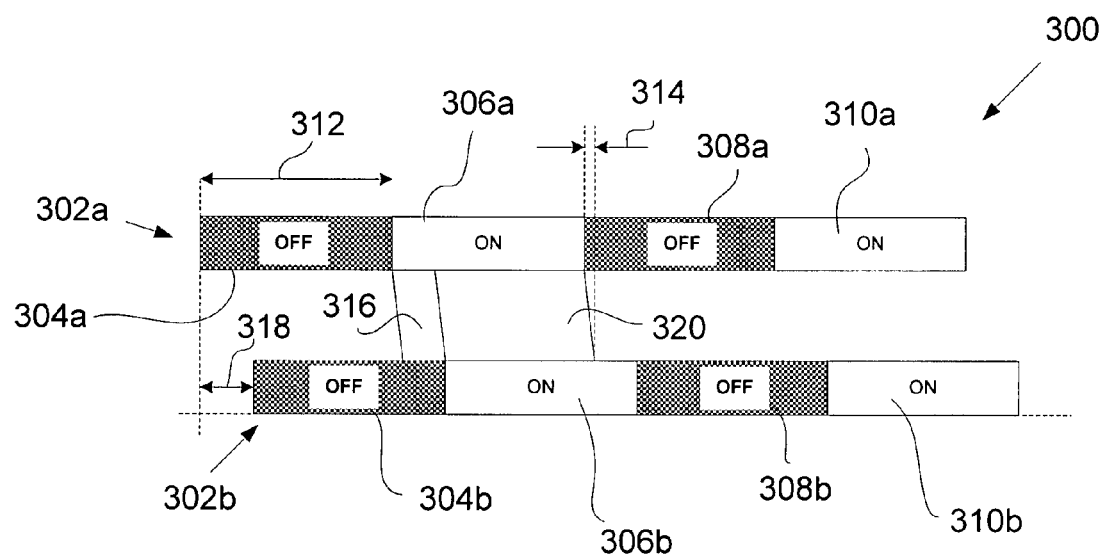
FIG. 3 depicts the misalignment of slots in a pair of nodes in a network.

FIG. 3 depicts the misalignment of slots in a pair of nodes 102a and 102b in the network 100 of FIG. 1. In particular, FIG. 3 shows a scheduling scheme 300 including a pair of nodes 302a and 302b that are duty-cycled such that their transceivers are either "on" or "off" during one or more time slots. Each time slot is of duration 312. In the illustrative scheduling scheme 300 the time slot schedule controlling the operation of node 102a requires the transceiver of node 102a to be powered "on" at least during time slots 306a and 310a and powered "off" at least during time slots 304a and 308a. The node is capable of transmitting and/or receiving data during a time slot that its transceiver is in the "on" state. Similarly, the time slot schedule controlling the operation of node 102b requires the transceiver of the node to be powered "on" at least during time slots 306b and 310b and powered "off" at least during time slots 304b and 308b.

The nodes 102a and 102b are misaligned such that the time slots are offset by a time period 318. The offset time period 318 causes a portion of the "off" slot 304b to overlap with a portion of the "on" slot 306a. During operation, a portion of a message 316 transmitted during time slot 306a is not received by the node 102b because it was "off" when the message portion 316 arrived. In many slotted communication protocols, the initial portion of a communication in a time slot is critical for a recipient to receive in order to receive the remainder of the communication. For example, the initial portions often include signaling data to inform the receiving node that additional data is forthcoming directed to that node. At the radio layer, the initial portions of a communication include waveforms used for phase alignment. Thus, even though node 102b is "on" when message portion 320 arrives, node 102b may not receive it.

To reliably communicate data, the nodes 102a and 102b have to be synchronized such that a message transmitted in a time slot by node 102a arrives in its entirety while node 102b is "on". This means that the beginning and end portions of the message that are transmitted at the beginning and end, respectively, of a time slot in node 102b have to be received during an "on" time slot in node 102b. If the time slots in node 102b are not aligned with the time slots in node 102a, then portions of the data packet may be received by node 102b in an adjacent time slot during which the node 102b may be "off" and unable to receive these portions of the transmitted data. To allow for reliable communication between nodes in the network, one or more nodes may include circuitry, and/or software as shown in FIG. 4, to synchronize (e.g., modifying time slot schedules in response to received data) it with another one of the nodes in the network.

Figure 4:
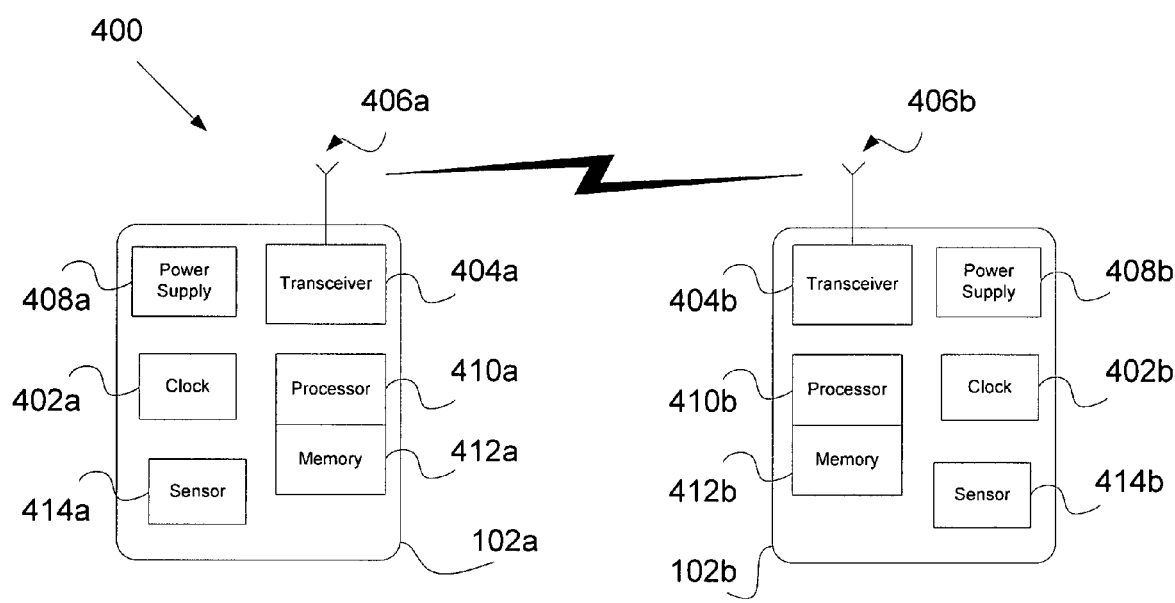
FIG. 4 depicts an exemplary pair of nodes of the communication network of FIG. 1.

FIG. 4 is a block diagram of nodes 102a and 102b. Nodes 102a and 102b include transceivers 404a and 404b ("transceiver 404"), respectively, that are connected to antennas 406a and 406b ("antenna 406"). The nodes 102a and 102b communicate with each other wirelessly; however, it can be understood that the nodes 102a and 102b can communicate in a wired network, without departing from the scope of the invention. The nodes 102a and 102b further include clocks 402a and 402b ("clock 402") for maintaining time. The clocks 402a and 402b are connected to processors 410a and 410b ("processor 410"). The processors 410a and 410b are connected to memory components 412a and 412b ("memory 412"). Nodes 102a and 102b may be part of a wireless sensor network. If so, the nodes 102a and 102b include one or more sensor components 414a and 414b ("sensors 414").

In a node 102, the processor 410 establishes a time slot schedule for the node. The schedule indicates which time slots in the node 102a should be "on," and in which of these "on" time slots, the node can transmit data. The processor 410 measures time with the aid of the clock 402.

A node 102a communicates with another node 102b when the transceivers of both the nodes 102a and 102b are in a "on" or "powered" state. For reliable and complete communication, the time slots during which each of the nodes 102a and 102b are "on," are synchronized, whereby each time slot begins and ends at substantially the same time. However, during normal operation, the time slots between neighboring nodes become misaligned and, consequently, unsynchronized. Thus, from time to time the nodes need to resynchronize.

Figure 5A:
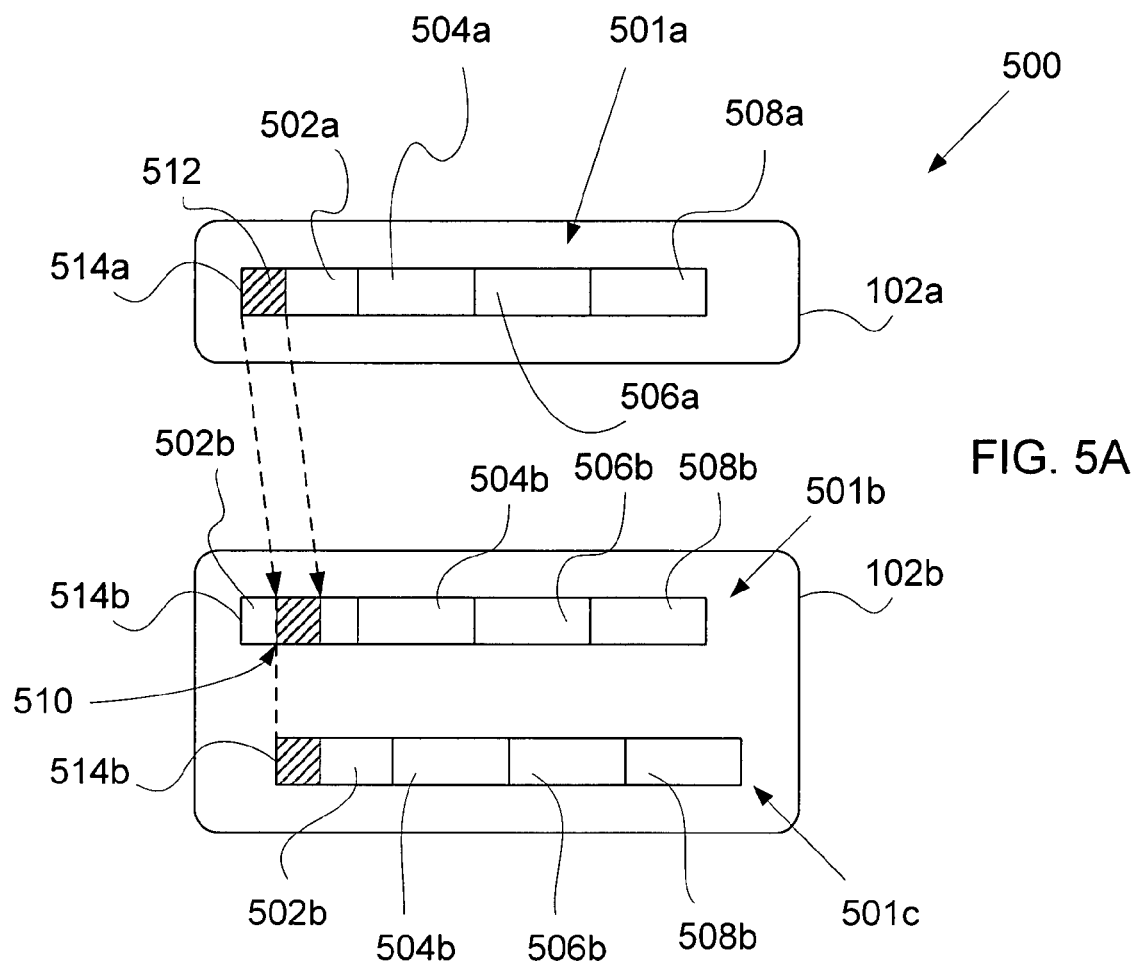
FIG. 5A depicts the synchronization of the pair of nodes, according to an illustrative embodiment of the invention.
Figure 5B:
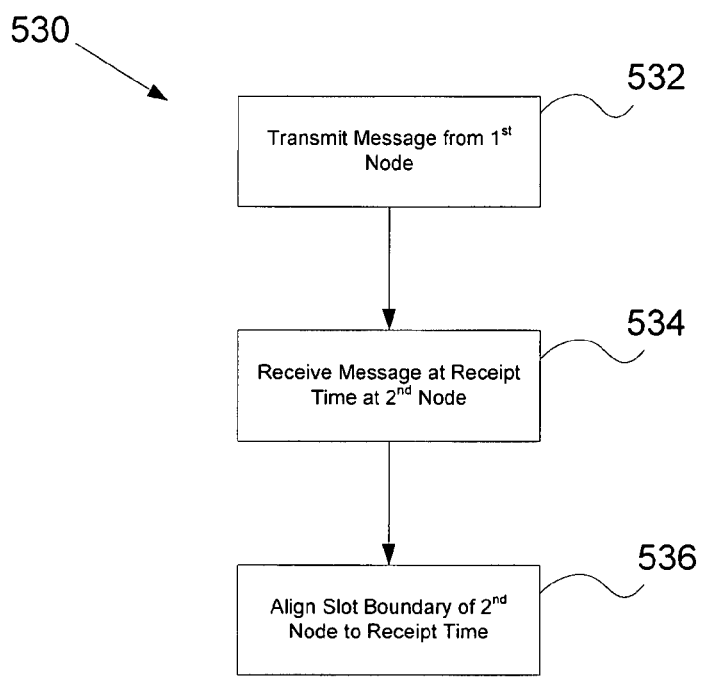
FIG. 5B is a flow diagram depicting a process for synchronizing of the pair of nodes of FIG. 2, according to an illustrative embodiment of the invention.

FIGS. 5A and 5B depict the synchronization of node 102b to node 102a of FIGS. 1-4, according to an illustrative embodiment of the invention. In particular, as depicted in FIG. 5A, node 102a includes a time slot schedule 501a having assigned time slots 502a, 504a, 506a and 508a. Similarly, node 102b includes a time slot schedule 501b having a slotted configuration with time slots 502b, 504b, 506b and 508b. Typically, the time slot schedules are calculated by the processor 410 (FIG. 4) and the state of the node 102a and 102b are stored in memory 412 (FIG. 4). During synchronization, the node 102a transmits a message 512 beginning at the slot boundary 514a of a time slot 502a (step 532, FIG. 5B). In certain embodiments, the processor 410a generates the message and sends it to the transceiver 404a, which in turn, transmits the message 512 during the appropriate time interval. The message 512 may include, among other things, a message identified as a synchronization message. The message 512 may exclusively consist of such a synchronization message. The message 512 may also be heartbeat signal. Alternatively, a receiving node may use any received message as a basis for resynchronization. The node 102b receives the message 512 after a certain delay (typically due to propagation of the signal through the wireless channel) at a receipt time 510 (step 534, FIG. 5B). As noted above due to factors such as clock drifts and propagation delay, the receipt time may not coincide with the slot boundary 514b of time slot 502b in node 102b.

In certain embodiments (not illustrated in FIG. 5A), the transmitted message occupies substantially the entire length of the time slot 502. In such embodiments, if the receipt time 510 does not coincide with the slot boundary 514b of time slot 502b, certain portions of the message may be received in time slot 504b. However, the node 102b may be duty-cycled such that the time slot 504b is assigned as an "off" state whereby the node 102b is non operational during the time slot 504b. In such cases, any portion or the entirety of the message received during time slot 504b may not be reliably received. To prevent such occurrences, upon receiving the message 512 at the receipt time 510, the node 102b adjusts its time slot schedule 501b to move the slot boundary 514b to substantially coincide with the receipt time 510, resulting in a new time slot schedule 501c (step 536, FIG. 5B).

In certain embodiments, the message 512 includes a data packet configured to be transmitted in a slotted communication network. The message 512 may include particular information relating to a node's location in the network, a node's relationship with one or more other nodes, one or more timestamps and any other flags or information relevant towards synchronization. In certain embodiments, the message 512 includes data that may not be related to synchronization. In such embodiments, the message 512 may still be used for synchronization because the receipt time of the message 512 in a node may be sufficient to align slot boundaries. In other embodiments, the synchronization message 512 includes a heartbeat signal. In still other embodiments, synchronization messages 512 may be embedded in other communication messages.

Figure 6A:
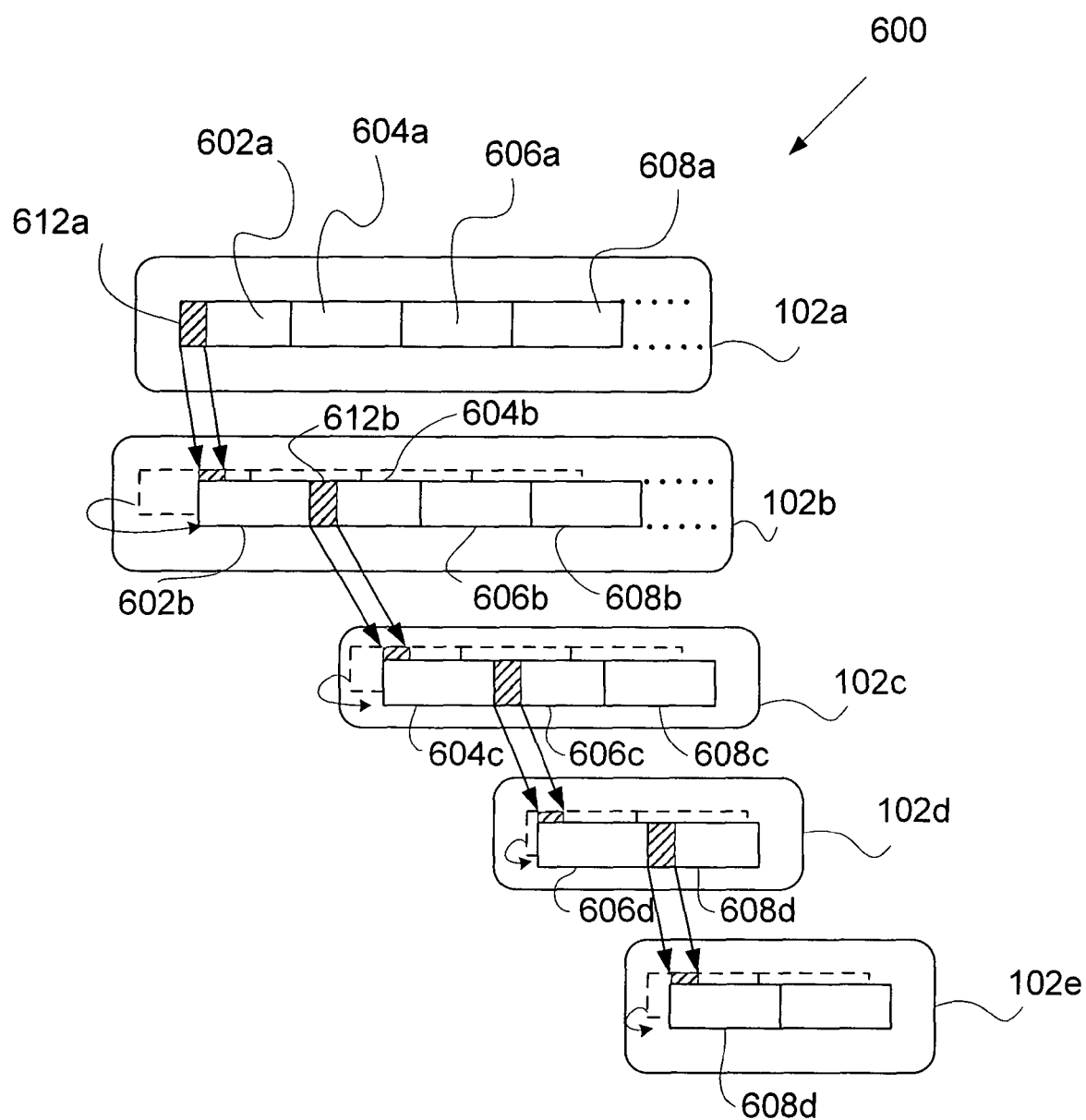
FIG. 6A depicts the synchronization of the network of FIG. 1, according to an illustrative embodiment of the invention.
Figure 6B:
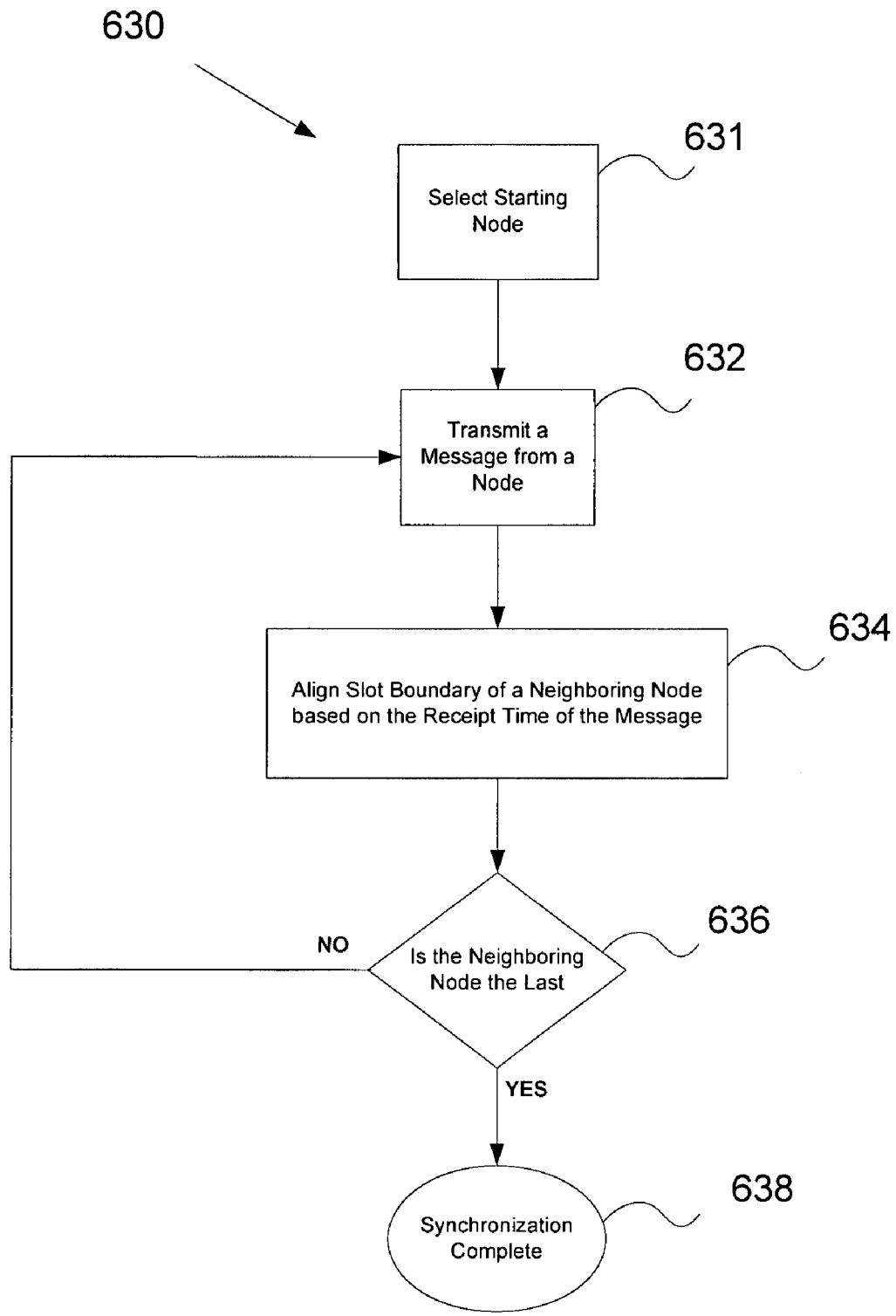
FIG. 6B is a flow diagram depicting a process for synchronizing the network of FIG. 2, according to an illustrative embodiment of the invention.

In certain embodiments, the above described method 530 used to synchronize communication pair 104 of nodes 102a and 102b, is applied repeatedly across each of the nodes 102a-102e in the network 100 to synchronize the entire network. FIGS. 6A and 6B depict the synchronization of the network 100 of FIG. 1, according to an illustrative embodiment of the invention.

FIGS. 6A and 6B depict the synchronization of the network 100 of FIG. 1, according to an illustrative embodiment of the invention. As shown in FIG. 6A, nodes 102a and 102b are configured with time slot schedules having corresponding time slots 602a, 604a, 606a, and 608a and time slots 602b, 604b, 606b, and 608b, respectively. Time slot 602a corresponds to time slot 602b, time slot 604a corresponds to time slot 604b, and so forth. Nodes 102c-102e are also configured with timing protocols having time slots that correspond to the time slots of nodes 102a and 102b, for example, time slots 604c, 606c and 608c; 606d and 608d; and time slots 608e and 610e, respectively. However, as noted earlier, due to various internal as well as external factors, the time slots in each of the nodes 102a-102e may become misaligned with respect to each other. As illustrated in the Figure, a first time slot, for example, time slot 602a of node 102a, may have become misaligned such that it begins after a second corresponding time slot, for example, 602b. In other cases, a first time slot, for example, time slot 604b, may begin before the start time of a corresponding second time slot 604c. To correct such a misalignment, the network 100 is synchronized such that each node 102a-102e is synchronized to its neighbor from which the node receives messages.

Referring to FIG. 6B, the synchronization process 630 begins with selecting a starting node (step 631) or root node from which to begin transmitting the synchronization message. In the illustrated embodiment of network 100, node 102a is selected as the starting root node since node 102a is not shown as having a neighbor from which it receives data (step 631). The node 102a transmits a synchronization message 612a to node 102b during time slot 602 (step 632). The node 102b receives message 612a at a time within the time slot 602b. Node 102b re-aligns the boundary of its slot 602b to the receipt time of the message from node 102a (step 634). Node 102b transmits a synchronization message 612b to node 102c during time slot 604b, and node 102c re-aligns the boundary of its slot 604c to the receipt time of the message from node 102b. In certain embodiments, the processor 410 in each node determines if it is the last node in the network 100 to be synchronized (step 636). If not, then the processor 410 instructs the node to transmit a synchronization message during the next time slot. In certain embodiments, synchronization of the network 100 is complete when each of the nodes 102a-102e are synchronized to their neighbor (step 638). In such embodiments, node 102b is synchronized with node 102a, node 102c is synchronized with node 102b, node 102d is synchronized with node 102c, and node 102e is synchronized with node 102d.

Figure 7:
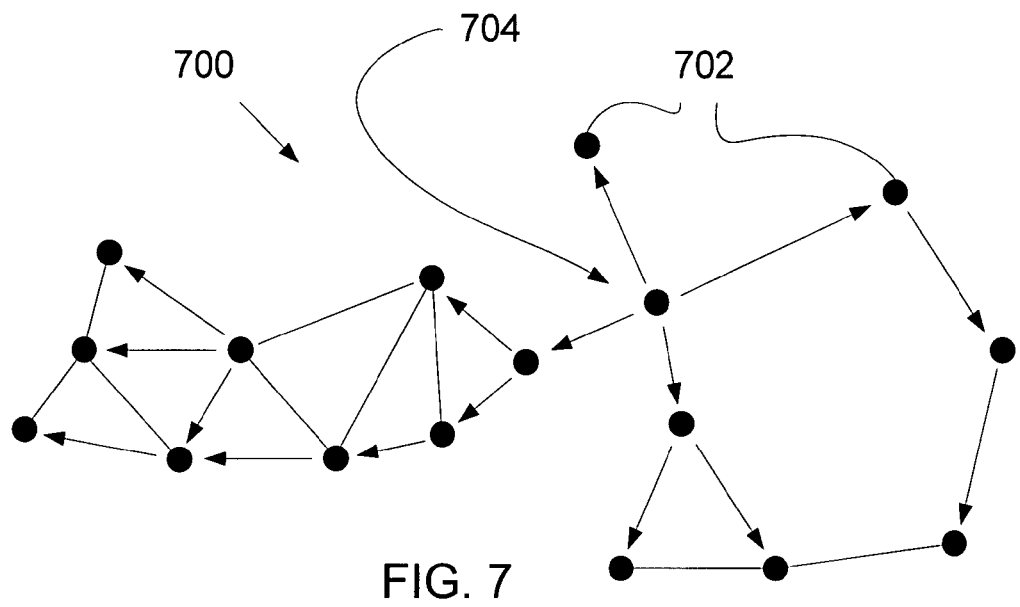
FIG. 7 depicts an exemplary slotted ad-hoc communication network.
Figure 8A:
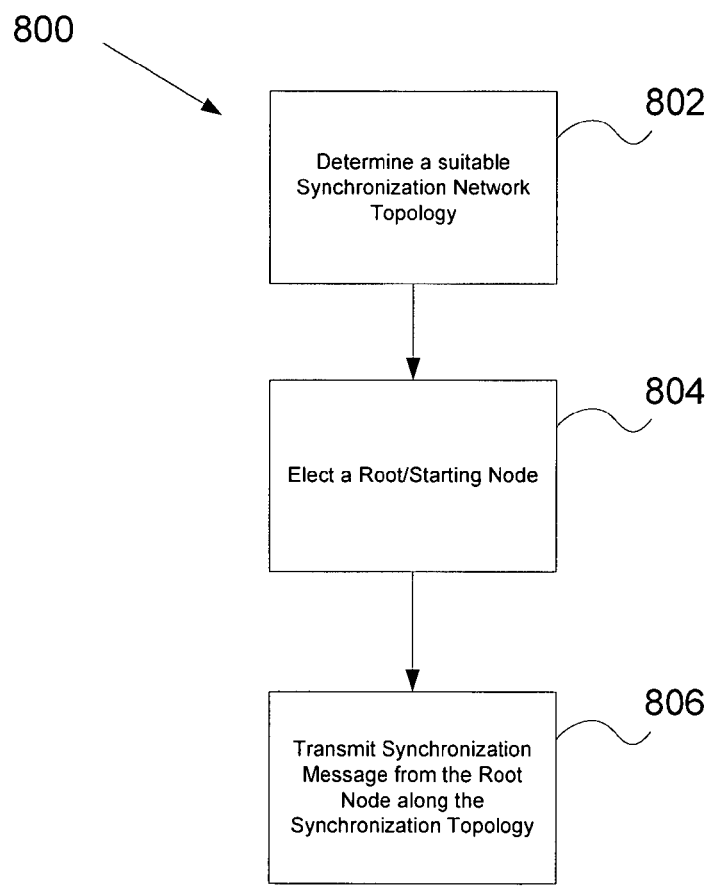
FIGS. 8A and 8B depict node-based processes for synchronizing a network, according to an illustrative embodiment of the invention.
Figure 8B:
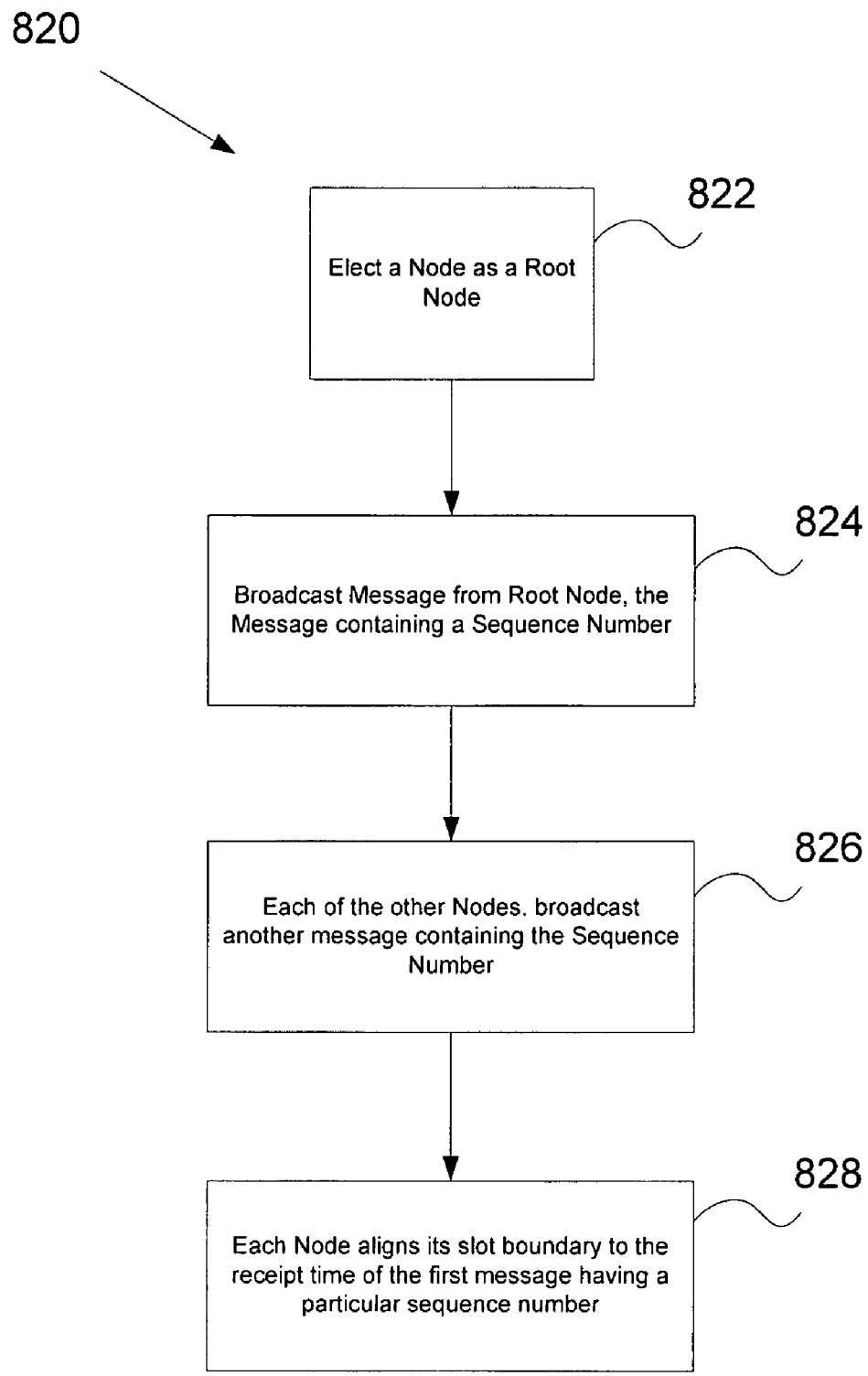
Figure 8C:
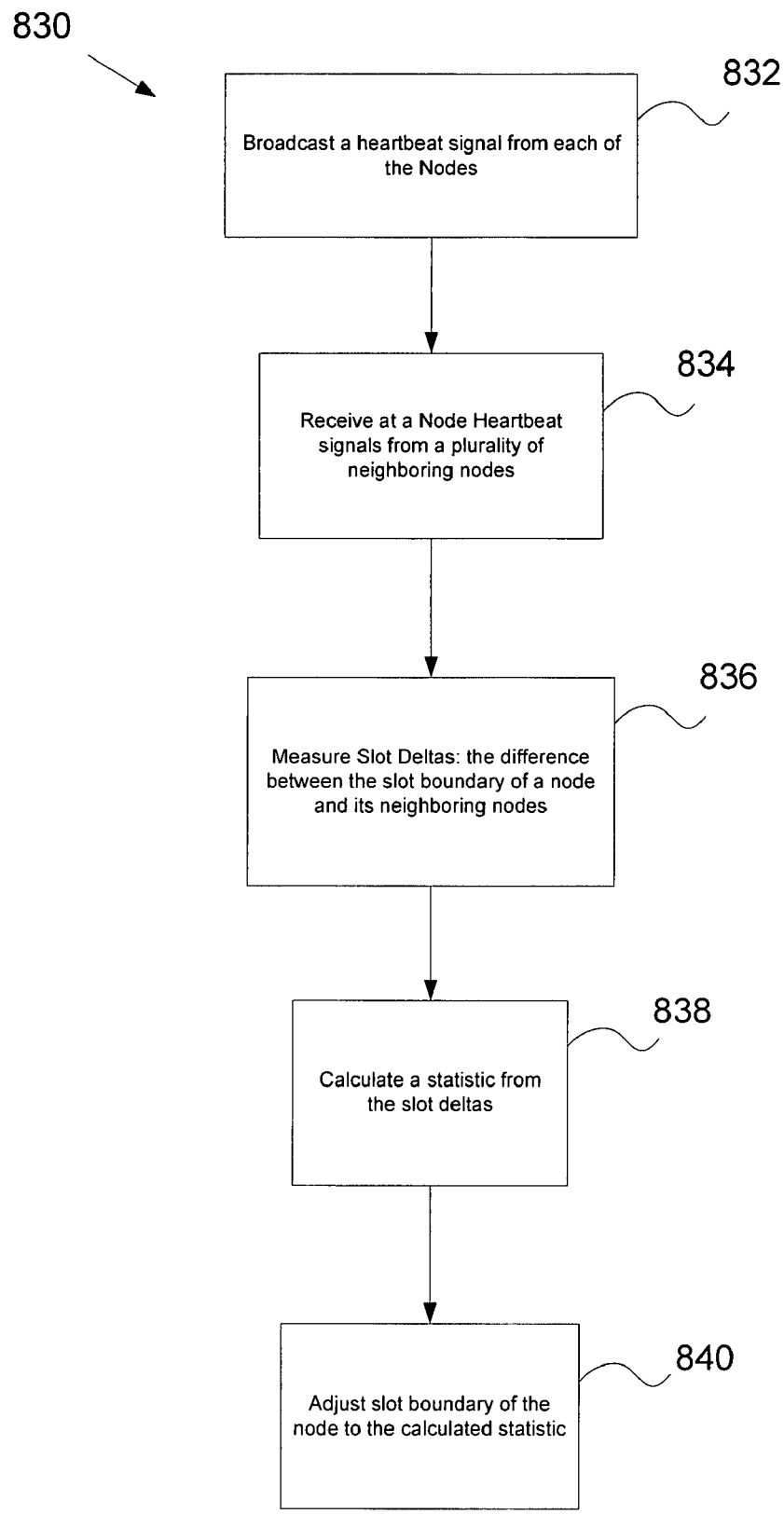
FIG. 8C depicts a filter-based process for synchronizing a network, according to an illustrative embodiment of the invention.

As noted earlier with reference to FIGS. 1-6B, network 100 includes nodes 102a-102e that are spatially arranged such that they are each within the range of one or two other nodes. Therefore, depending on the direction of communication, each node typically communicates with one other node in the network 100. The nodes in network 100 may communicate and/or be synchronized in any direction as desired without departing from the scope of the invention. However, in certain network topologies, the nodes may be spatially arranged such that each node is within the range of more than two nodes and therefore capable of communicating with more than one node in the network. FIGS. 7-8C depict such networks and processes for synchronizing them.

In particular, FIG. 7 depicts an exemplary slotted ad-hoc communication network 700 having a plurality of nodes 702. As shown, each node 702 in network 700 is connected to each other either through arrows or lines. The arrows indicate possible direction of synchronization from one node 702 to another node 702. The arrows are merely for illustrative purposes and do not limit the scope of the invention. The nodes in network 700 may communicate and/or be synchronized in any direction and along any path as desired without departing from the scope of the invention. The straight lines connecting certain nodes indicate that those nodes 702 are within communication range of each other; however, they may not be configured to communicate with each other. In certain embodiments, synchronization messages are sent along the arrows from one node 702 to another until each node is synchronized to its neighbor. These synchronization messages typically originate from a starting node or root node 704 and propagate along a selected path through the network to reach each of the nodes. In certain embodiments, the synchronization messages originate from one or more nodes in network 700.

To achieve network-wide 700 synchronization in an efficient and accurate manner, these synchronization messages are transmitted along a communication path that is deemed to be optimal. In certain embodiments, for a given node, the optimal path is the shortest path to the root or starting node. In other embodiments, the optimal path is selected as desired based on the application. In certain embodiments, based on the selection of the root or starting node, one path might allow for faster synchronization of the network than another path. In such networks 700, the selection of a root node, calculation of optimal paths or network topology, and the contents of synchronizing messages may play a role in the performance of the synchronization of the network 700. FIGS. 8A-8C depict processes for synchronizing networks such as network 700.

FIGS. 8A and 8B depicts processes for synchronizing a network, according to an illustrative embodiment of the invention. The process 800 of FIG. 8A begins with determining a suitable synchronization network topology (step 802, FIG. 8A). A network topology typically describes the interconnectivity of the various nodes in the network. In certain embodiments, to determine such a topology, the plurality of nodes and their interconnectivity in a network can be modeled as a graph in mathematics having several statistical properties. Using certain statistical properties of these mathematical graphs, one or more interconnections can be identified, thereby providing a network topology that describes the interconnection of nodes in the network. In certain embodiments, the synchronization network topology includes a Minimum Hop Level Spanning Tree or its approximation. In certain embodiments, the synchronization network topology includes a Breadth-First Search (BFS) Spanning Tree.

In certain embodiments, a synchronization network topology is determined by each node from the information gathered from other nodes in the network. Each of the nodes sends out periodic heartbeats to neighbors by means of a broadcast. Each heartbeat broadcast contains information about the node, its neighbors and the node's relationship with the neighbors. Each of the nodes adjusts its location in the synchronization network topology based on the received heartbeat broadcasts.

Once the synchronization network topology is established whereby each node is connected to a neighbor along a selected path, a node 704 is elected as a root node or starting node (step 804, FIG. 8A). In certain embodiments, the step of electing a root node is performed simultaneously with the determination of a suitable network topology. The root node transmits and/or broadcasts a synchronization message (step 806) that is used to synchronize the neighboring nodes. With the aid of these neighboring nodes, one or more synchronization messages are propagated from the root node along the synchronization network topology to each of the other nodes in the network.

In certain embodiments, the calculation of a synchronization network topology may be avoided by driving the synchronization process from the root node as depicted in FIG. 8B. In particular, the process 820 depicted in FIG. 8B begins with electing a node in the network as a starting node or root node (step 822). The root node broadcasts a message through a periodic heartbeat that contains a sequence number (step 824). The root node increments the sequence number before sending out the next heartbeat. Each node receiving the message, either directly or indirectly, from the root node keeps track of the largest sequence number received so far. Each node adjusts its slot boundary to the receipt time of the first message having a particular sequence number (step 828), thereby synchronizing the network. Each node may then broadcast another message that includes the largest sequence number received so far in its periodic heartbeat message.

As discussed thus far, a node is synchronized with a neighboring node by aligning its slot boundary based on the receipt time of a synchronization message from the neighboring node. In certain embodiments, instead of associating the slot boundary of a node to a particular neighboring node or the closest neighboring node, the slot boundary can be associated with a plurality of neighboring nodes.

FIG. 8C depicts a process 830 for synchronizing a network, according to an illustrative embodiment of the invention. The process 830 begins when the nodes in the network broadcast a message and/or a heartbeat signal (step 832). Each node may, therefore, receive a plurality of messages or heartbeat signals from a plurality of neighboring nodes (step 834). The node measures the time difference between its slot boundary and the receipt times of each of the plurality of messages or heartbeat signals (step 836). In certain embodiments, the node measures the time difference between its slot boundary and the slot boundaries of each its neighboring nodes, referred to as slot deltas. The node calculates one or more statistics from these slot deltas including at least one of mean, median, mode, maximum, and minimum (step 838). To synchronize the network, the node adjusts its slot boundary based, at least in part, on the calculated statistics (step 840). As an example, the node adjusts its slot boundary by the mean of the slot-deltas.

In certain embodiments, the nodes in a network are re-synchronized when the misalignment between communicating nodes are greater than certain thresholds. If such thresholds are not crossed within a pre-determined waiting period, the nodes in the network may be re-synchronized after the expiration of the waiting time period. In certain embodiments, nodes in a network are re-synchronized after periodic intervals of time. In still other embodiments, the nodes in a network are re-synchronized as desired depending on the application. Depending on the direction of communication, the transmitting node may periodically send synchronization messages to synchronize one or more nodes in the network.

To ensure reliable communication of data between two or more nodes, even if there are misalignments between re-synchronizations, the slots may be provisioned with guard times. These guard times are portions, typically at the beginning and at the end of each slot, during which data is not transmitted. Guard times are typically calculated based on the parameters described with reference to FIG. 3.

Figure 9:
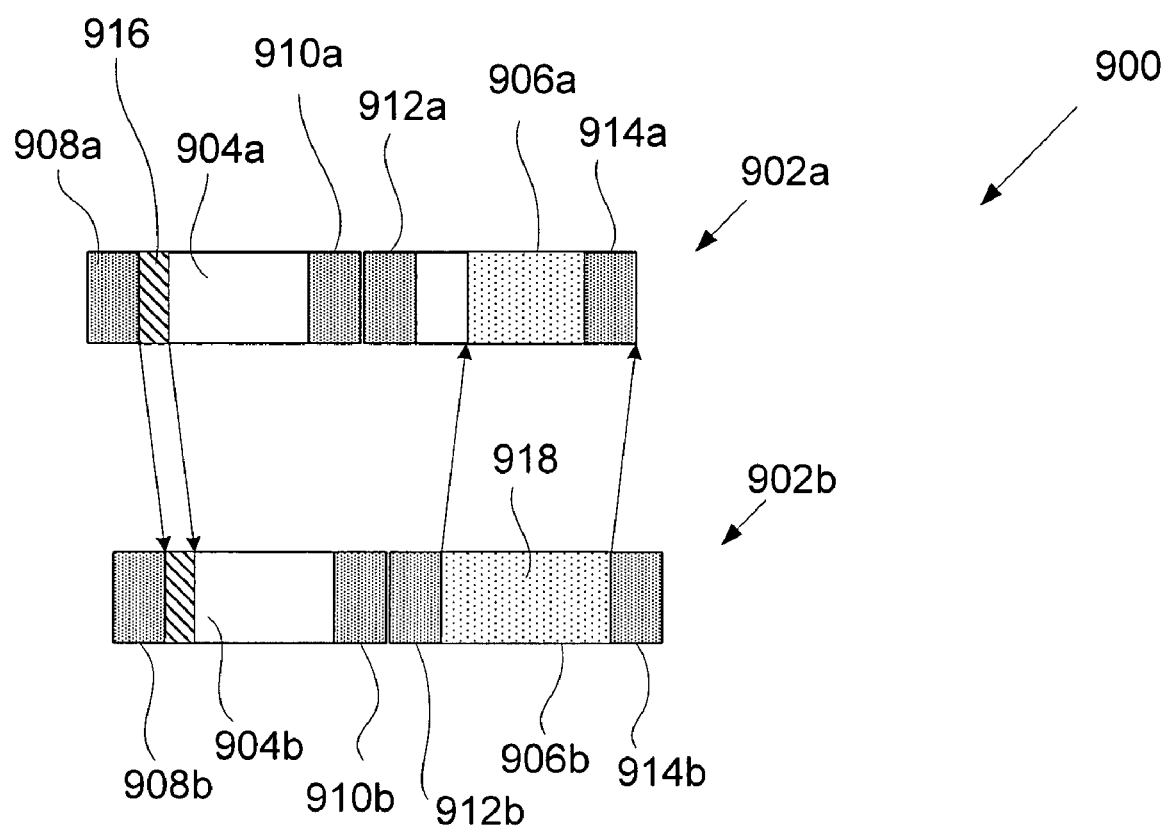
FIG. 9 depicts the synchronization of slots provisioned with exemplary guard times.

In certain embodiments, guard times are useful for communication in a direction that is opposite to that of synchronization. As described earlier, a node is synchronized with a neighbor when the slot boundary of the node is shifted in time to match the receipt time of a message transmitted from the neighbor. However, in certain embodiments, the node may need to transmit data back to the neighboring node. This might be made difficult due to the shifting of the slot boundary of the node. FIG. 9 depicts the provisioning of guard times to ease such a reverse transmission of data in a network.

FIG. 9 depicts the synchronization 900 of slots provisioned with guard times. Node 902a has a time slot schedule in which a slot 904a is provisioned with a beginning guard time 908a and an end guard time 910a. Similarly, slot 906a is provisioned with a beginning guard time 912a and an end guard time 914a. Also, node 902b has a timing protocol in which slots 904b and 906b are provisioned with guard times 908b, 910b, 912b and 914b. During operation, node 902a sends a message 916 during slot 904a and after the end of the guard time 908a. On receiving the message 916, the node 902b, aligns its slot boundary such that the end of the guard time 908b is shifted to the receipt time of the message 916 at the node 902b.

In certain embodiments, the node 902b transmits a message 918 during slot 906b back to node 902a. Since the slots in node 902b are shifted from the previous synchronization, a portion of the message sent near the end of the slot 906b is received by node 902a during guard time 914a. In certain embodiments, node 902a is capable of receiving messages during the guard times and therefore the message can be reliably communicated. The guard times provide a buffer which is capable of tolerating misalignments in the slots in the period between re-synchronizations. The processes 900, 920 and 930 described with reference to FIGS. 8A-8C may be used to re-synchronize a network either periodically or at selected times.

Figure 10:
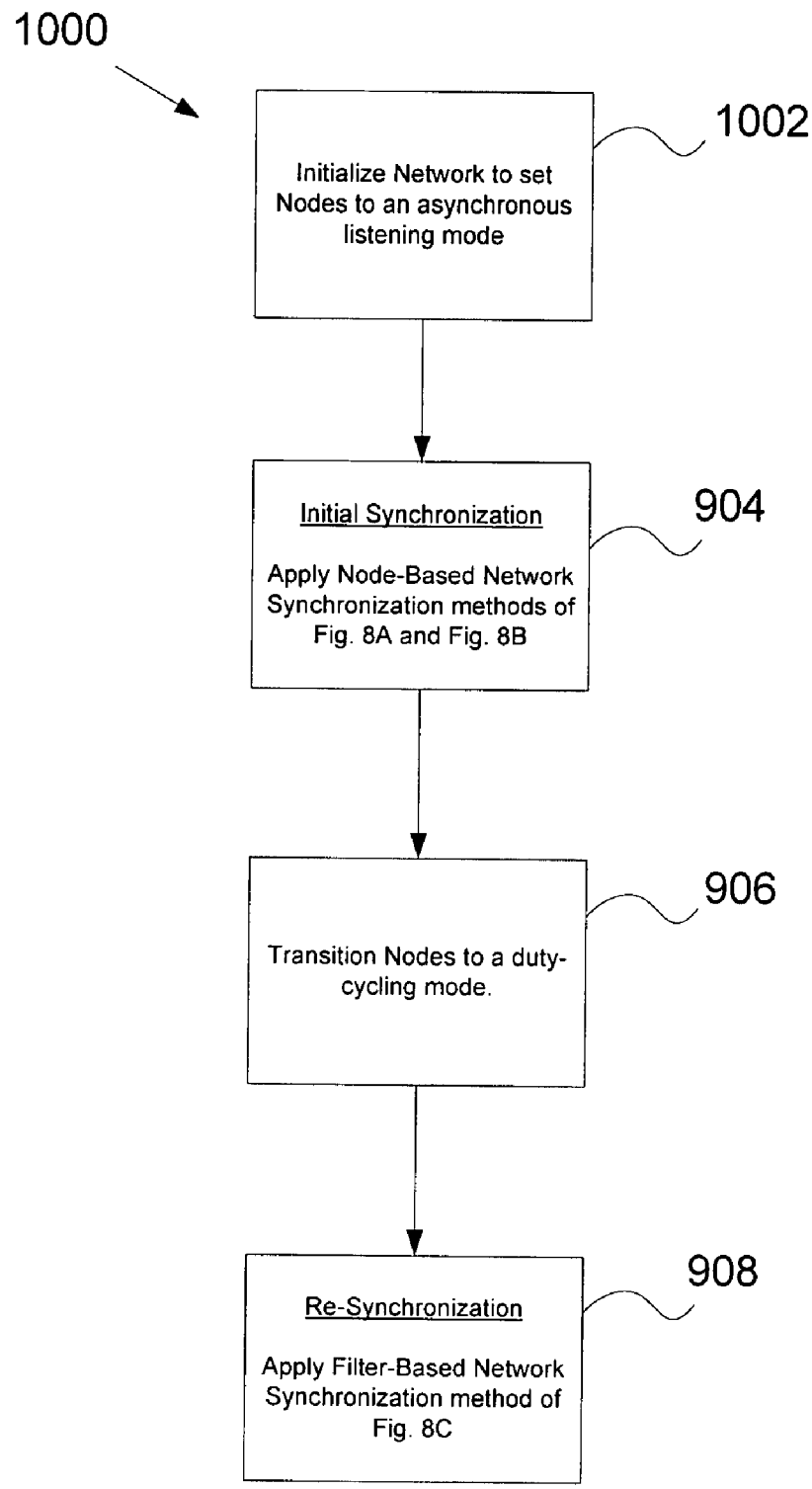
FIG. 10 is a flow diagram depicting the synchronization and re-synchronization of nodes in a network, according to an illustrative embodiment of the invention.

In certain embodiments, as illustrated in FIG. 10, the processes 800, 820 and 830 may be used in combination for at least one of initial synchronization and re-synchronization. FIG. 10 is a flow diagram depicting a process 1000 for synchronizing and re-synchronizing nodes in a network, according to an illustrative embodiment of the invention. The process 1000 begins with initializing a network to an asynchronous listening mode (step 1002) whereby each of the nodes in the network are turned "on" and kept at low power so that they may be able to listen to synchronization messages or heartbeat signals. During initial synchronization, the processes 800 and 820 described with reference to FIGS. 8A and 8B are applied to synchronize the network (step 1004). Once the network is initialized and synchronized, the nodes are transitioned into a duty-cycling mode whereby the nodes are either "on" or "off" during selected time slots (step 1006). During the duty-cycling mode the nodes are re-synchronized using the process 830 described with reference to FIG. 8C (step 1008).

The processes described herein may be carried out by software, firmware, or microcode or computing device of any type. Additionally, software implementing the processes may comprise computer executable instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

The processor 410 may include a single microprocessor or a plurality of microprocessors for configuring the node as a multi-processor system. The processor may be a shared purpose processor, a DSP, an ASIC or other special purpose processor. The memory 412 may include a main memory and a read only memory. The memory 412 may also include a mass storage device having, for example, various disk drives, tape drives, etc. The memory 412 may further include dynamic random access memory (DRAM) and high-speed cache memory. In operation, the main memory 412 stores at least portions of instructions and data for execution by the processor 410 to carry out the functions described herein.

As noted above, the order in which the steps of the present method are performed is purely illustrative in nature. In fact, the steps can be performed in any order or in parallel, unless otherwise indicated by the present disclosure. The invention may be embodied in other specific forms without departing from the spirit or essential characteristics thereof. The foregoing embodiments are each therefore to be considered in all respects illustrative, rather than limiting of the invention.

The invention claimed is:

1. A method for synchronizing nodes by managing time slots in a slotted communication network, comprising:
    providing a slotted communication network, including a first node configured to operate at least during a first time slot, and a second node having a schedule of time slots configured to operate at least during a second time slot, wherein the second time slot corresponds to the first time slot; transmitting, from the first node, a message during the first time slot; receiving, at the second node, the message, at a first receipt time during the second time slot; and
    adjusting the timeslot schedule of the second node by aligning a boundary portion of the second time slot with the first receipt time to synchronize the second time slot with the first time slot, thereby providing sufficient time for the second node to receive the message during the second time slot,
    wherein aligning the boundary portion includes shifting at least one of a start time of the second time slot, an end time of the second time slot, and an edge of a guard time period of the second time slot based on the first receipt time.

2. The method of claim 1, wherein the second time slot includes a data time period in between two guard time periods.

3. The method of claim 1, wherein the message is transmitted during or at the beginning of a boundary portion of the first time slot.

4. The method of claim 1, wherein at least one of the first node and the second node is configured to operate during a plurality of time slots according to pre-determined schedule.

5. The method of claim 1, wherein at least one of the first node and the second node is configured to operate during a plurality of time slots according to dynamically determined schedule.

6. The method of claim 1, further comprising repeating the steps of transmitting the message, receiving the message and aligning the second time slot after a re-sync time period has elapsed.

7. The method of claim 6, wherein at least one of the first time slot and second time slot includes a guard time period having a length based at least in part on the re-sync time period.

8. The method of claim 1, wherein the slotted communication network further includes a third node configured to operate during a third time slot, the method further comprising:
transmitting, from the second node, a second message during the second time slot;
receiving, at the third node, the second message, at a second receipt time during the third time slot; and
aligning a boundary portion of the third time slot with the second receipt time, thereby synchronizing the third time slot with the second time slot.

9. The method of claim 1, wherein the slotted communication network comprises at least one of a mobile ad-hoc network, a wireless sensor network and a wireless mesh network.

10. The method of claim 1, wherein the message includes network topology information.

11. The method of claim 1, wherein the message includes a heartbeat signal.

12. A node in a slotted-communication network, comprising:
a receiver configured to receive a message at a receipt time during a first time slot in a schedule of time slots, the message having been transmitted by a transmitting node, and
a processor configured for adjusting the timeslot schedule by aligning a boundary portion of the first time slot with the receipt time, thereby providing suffcient time for the node to receive the message during the first time slot,
wherein aligning the boundary portion includes shifting at least one of a start time of the first time slot, an end time of the first time slot, and an edge of a guard time period of the first time slot based on the receipt time, and
wherein the processor aligns the boundary portion of the first time slot with the receipt time without synchronizing the clock of the node with the clock of the transmitting node.

13. The node of claim 12, wherein the first time slot includes a data time period in between two guard time periods.

14. The node of claim 12, wherein after a re-sync time period has elapsed, the receiver receives a second message and the processor aligns a second time slot to the receipt time of the second message.

15. The method of claim 14, wherein the first time slot includes a guard time period having a length based at least in part on the re-sync time period.

16. The node of claim 12, wherein the node comprises a transmitter for transmitting a message during a second time slot based on which a second node synchronizes at least one time slot to at least one time slot of the node transmitting the message.

17. The node of claim 12, wherein the message includes a heartbeat signal.

18. A method for synchronizing nodes by managing time slots in a slotted communication network, comprising:
providing a network topology for a communication network including a plurality of nodes,
selecting a root node from the plurality of nodes in the network, transmitting from a first node a first message,
adjusting a timeslot schedule of a second node by aligning a slot boundary of the second node, neighboring the first node along the network topology, based on the receipt time of the first message, and
transmitting from the second node a second message, and
adjusting a timeslot schedule of a third node by aligning a slot boundary of the third node, neighboring the second node along the network topology, based on the receipt time of the first message, wherein a slot boundary is at least one of a start time of a time slot, an end time of a time slot, and an edge of a guard time period of a time slot.

* * * * *